F. R. WELLS.
DETACHABLE DUPLEX VESSEL.
APPLICATION FILED MAY 31, 1917.
1,266,362.
Patented May 14, 1918.
2 SHEETS—SHEET 1.
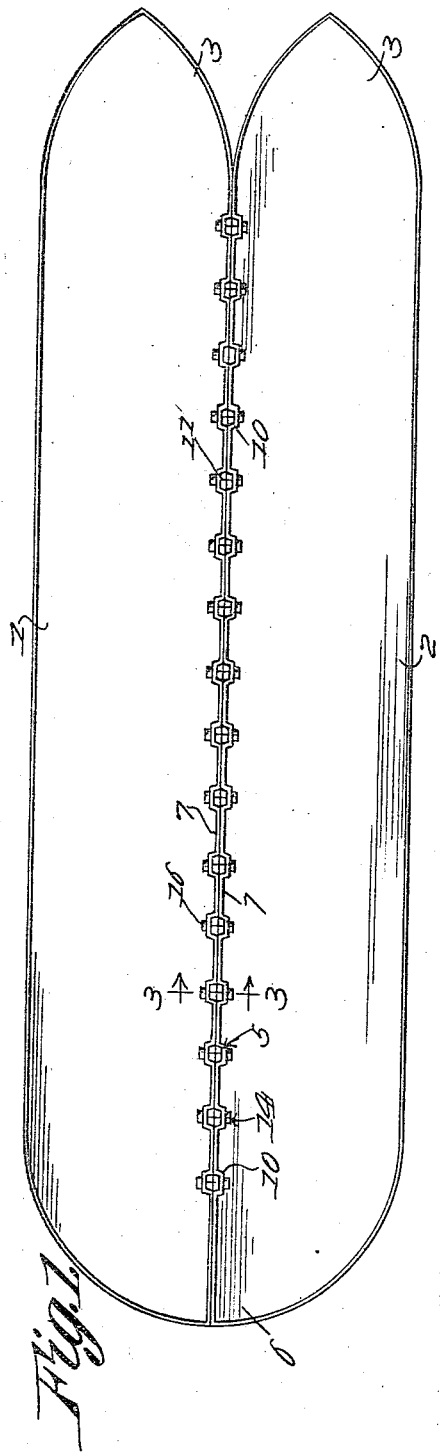
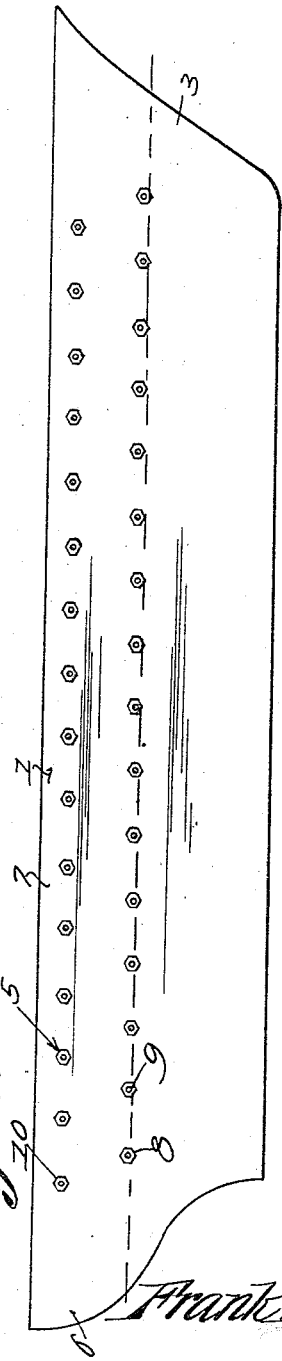

F. R. WELLS.
DETACHABLE DUPLEX VESSEL.
APPLICATION FILED MAY 31, 1917.
1,266,362.
Patented May 14, 1918.
2 SHEETS—SHEET 2.
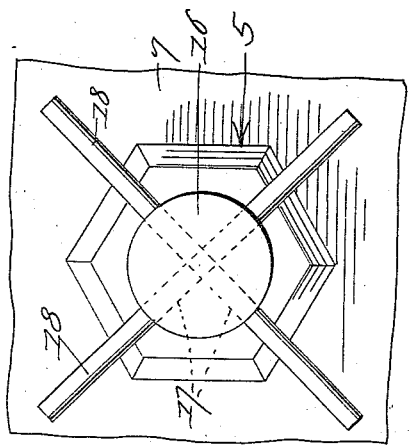
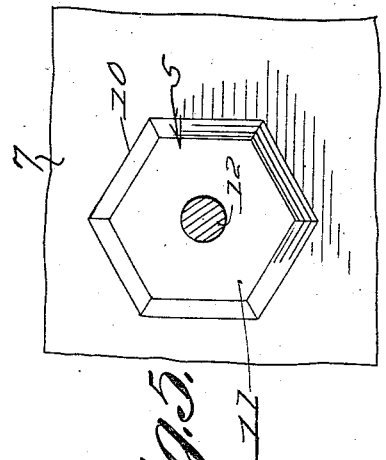
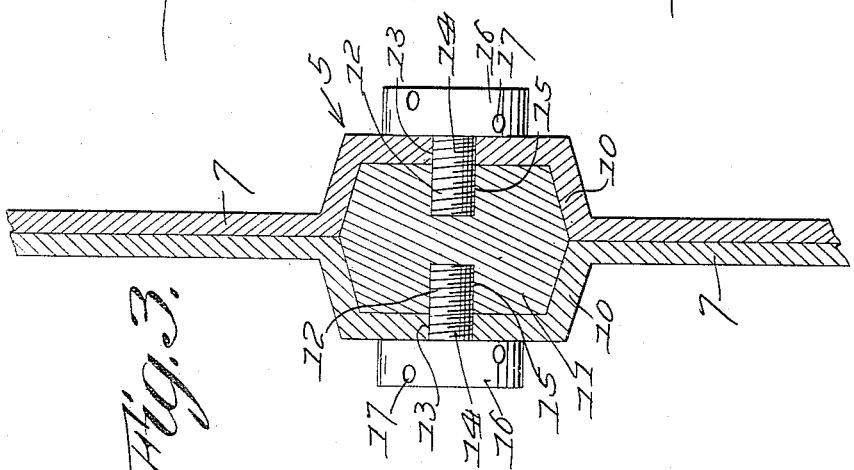
Inventor
Frank R. Wells,
By
Talbert Parker
Attorneys

UNITED STATES PATENT OFFICE.

FRANK R. WELLS, OF SPRINGFIELD, OHIO.

DETACHABLE DUPLEX VESSEL.

1,266,362.                    Specification of Letters Patent.           Patented May 14, 1918.

Application filed May 31, 1917. Serial No. 171,977.

*To all whom it may concern:*

Be it known that I, FRANK R. WELLS, a citizen of the United States, residing at Springfield, in the county of Clark and State of Ohio, have invented certain useful Improvements in Detachable Duplex Vessels, of which the following is a specification, reference being had therein to the accompanying drawing.

This invention relates broadly to that class of inventions known as ships and more particularly relates to a detachable duplex vessel.

As the primary aim and object the present invention contemplates the provision of novel means for removably connecting two complemental vessels in abutting relation with respect to each other so they in effect provide a single vessel but are capable of being detached from each other in the event of serious injury to one of the vessels subsequent to the transferring of the passengers and cargo from the damaged vessel to the good vessel so as to save the same by preventing them from sinking with the damaged vessel.

It is an equally important object of this invention to so construct the means for removably fastening the vessels so that the strain will be equally imposed on the adjacent sides of the vessels when the vessels are subjected to the rolling action of the sea.

More particularly the present invention includes the provision of improved means for actuating the fastening means so that the vessels may be fastened to each other or separated as the occasion may require.

Among the other aims and objects of this invention may be recited the provision of a device of the character mentioned with a view to compactness, in which the number of parts are few, the construction simple, the cost of production low and the efficiency high.

Other objects as well as the nature, characteristic features and scope of this invention will be more readily apparent from the following description taken in connection with the accompanying drawings and pointed out in the claims forming a part of this specification.

The invention is clearly illustrated in the accompanying drawings in which:—

Figure 1 is a top plan view of the invention showing the vessels connected;

Fig. 2 is a side elevation of one of the vessels separated from the other;

Fig. 3 is an enlarged transverse section taken on line 3—3 of Fig. 1;

Fig. 4 is a side elevation of one of the fastening means;

Fig. 5 is an elevation of the fastening means, partly in section looking toward the outside of the vessel.

Similar characters of reference are employed in all of the above described views, to indicate corresponding parts.

Referring now, more particularly, to the accompanying drawings, there is provided a pair of complemental vessels indicated in their entireties by the numerals 1 and 2 removably secured so that their adjacent sides abut each other approximately throughout their entire lengths in order that the bows 3 are arranged in close relation with each other while the sterns may be constructed in a quarter-circular formation so that when they are held by improved fastening means indicated in their entireties by the numerals 5 they assume a semi-circular form as indicated by the numeral 6.

With a view toward providing fastening means adjacent sides 7 of the vessels, they are provided near the water line with a longitudinal series of spaced pockets 8 preferably of a hexagonal configuration as indicated by the numeral 9. Likewise the sides of the vessels are provided with similar pockets 10 adjacent the upper inner rails of the vessels and arranged alternately with respect to the pockets 8. Of course, a plurality of rows of the longitudinal series of pockets may be provided at each deck in the hull to assure of effective securing of the vessels. Disposed in the opposed pockets 8 and 10 are hexagonal blocks 11 of such a length as to be readily accommodated in the opposed pockets whereby to allow the adjacent sides 7 to lie in abutting relation with respect to each other. The respective ends of each of the blocks are provided with inwardly extending threaded sockets 12 arranged in opposed relation with respect to each other and in alinement with correspondingly formed openings 13 in the bottoms of the pockets. Relatively large screws 14 are now provided in the present instance consisting of threaded shanks 15 with circular heads 16. The shanks 15 are engaged in the openings in the adjacent sockets 12 so that the heads lie on the inner surfaces of the sides 7 and are accessible from within the body of each vessel in order that they may be actuated so as to be effectively anchored through the pockets into the blocks so as to removably clamp the vessels in suitable rigid relation with respect to each other and in effect provide a single vessel when fastened to one that is capable of being disconnected when the occasion may require.

As intimated, improved means have been provided for actuating the set screws 14. In reducing this feature of the invention to practice the heads are provided with diametrically extending bores 17 which are out of alinement with each other. Handle bars 18 are inserted through the openings and project beyond the periphery of each head being arranged in cross like formation so as to be readily engageable by the hands of a person in actuating the shanks to either fasten or unfasten a vessel.

In use, the vessels 1 and 2 are normally fastened with respect to each other, but in the event that either one of the vessels is damaged so that it will in all probabilities sink, the cargo and passengers are transferred from the damaged vessel to the good vessel whereupon set screws on the good vessel are actuated so as to release the other vessel and abandon it. Of course each of the vessels is desirably fitted with independent operating and guiding means so that when they are disconnected they may be propelled and steered independently of each other.

It is thought in view of the foregoing description that a further detail description of the operation of the invention is entirely unnecessary. Likewise, it is believed that the advantage of the invention will be readily apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent, is:—

1. A device of the character described including a pair of complemental vessels, pockets formed in the adjacent sides of the vessels and arranged in opposed relation with respect to each other when the sides of the vessels are in abutting relation, blocks fitted in the opposed pockets, and fastening means engageable through the pockets and anchored in the blocks for detachably holding the vessels in detached relation.

2. A device of the character described including a pair of complemental vessels, pockets formed in the adjacent sides of the vessels and arranged in opposed relation with respect to each other when the sides of the vessels abut each other, blocks seated in the pockets, fastening devices fastened from the inner surfaces of the adjacent sides and anchored in the blocks, and means for actuating the fastening devices so as to either hold the vessels in substantial rigid relation with each other or separate them.

3. A device of the character described including a pair of complemental vessels, hexagonal shaped pockets formed on the adjacent sides of the vessels, the pockets being arranged in rows, the pockets in each row being arranged alternately with respect to the pockets in the adjacent row, blocks seated in opposed pockets when the sides of the vessels abut each other, set screws mounted in the sides of the vessels and removably anchored in the blocks, and means for adjusting the set screws.

In testimony whereof I affix my signature.

FRANK R. WELLS.

Copies of this patent may be obtained for five cents each, by addressing the "Commissioner of Patents, Washington, D. C."